(12) United States Patent
Ramesh et al.

(10) Patent No.: US 6,778,838 B1
(45) Date of Patent: Aug. 17, 2004

(54) PHASE NULL MITIGATION METHOD

(75) Inventors: Rajaram Ramesh, Cary, NC (US); Tracy L. Fulghum, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 784 days.

(21) Appl. No.: 09/686,518

(22) Filed: Oct. 11, 2000

(51) Int. Cl.$^7$ .................. H04B 15/00; H04B 7/005; H04B 7/01; H04B 7/015
(52) U.S. Cl. .................. 455/503; 455/502; 455/434; 370/278; 370/282; 370/320
(58) Field of Search .................. 455/503, 502, 455/500, 432.1, 434, 443; 370/278, 282, 320, 342, 441, 479, 516

(56) References Cited

U.S. PATENT DOCUMENTS

| | | | | |
|---|---|---|---|---|
| 4,570,265 A | * | 2/1986 | Thro ........................ 455/503 |
| 5,710,546 A | * | 1/1998 | Leitch ........................ 340/7.25 |
| 5,974,042 A | * | 10/1999 | Frank et al. ................. 370/342 |
| 6,005,884 A | * | 12/1999 | Cook et al. .................. 375/132 |
| 6,044,276 A | * | 3/2000 | Goldberg et al. ............ 455/503 |
| 6,426,980 B1 | * | 7/2002 | Gorday et al. .............. 375/295 |
| 6,510,147 B1 | * | 1/2003 | Sun et al. .................... 370/335 |

FOREIGN PATENT DOCUMENTS

EP      0 923 203      6/1999

* cited by examiner

*Primary Examiner*—Nay Maung
*Assistant Examiner*—Edan Orgad
(74) *Attorney, Agent, or Firm*—Coats & Bennett, P.L.L.C.

(57) ABSTRACT

A method of mitigating phase nulls in a local wireless telephone system comprises inserting one or more random bits into a frame of a simulcast signal. The introduction of the random bits into the frame causes subsequent bits in the frame to be modulated differently, thereby reducing phase cancellation nulls. While particularly suited to localized wireless telephone systems, the methodology may be equally adapted to any mobile network wherein geographically proximate antennas broadcast the same signals.

17 Claims, 7 Drawing Sheets

PHASE NULL MITIGATION METHOD

BACKGROUND OF THE INVENTION

The present invention relates generally to wireless communications and, more particularly, to a method for simulcast transmissions.

In recent years, there has been increased interest in building localized, private wireless telephone systems used by corporations or other organizations. Private wireless telephone systems employ many concepts and features used by conventional cellular networks and may be thought of as a scaled-down cellular network. A plurality of radio heads are positioned throughout the building or facility to provide radio coverage within the facility. The radio heads are connected to a central controller which, in turn, connects the private wireless telephone system with other networks, such as a public land mobile network or the public-switched telephone network.

One advantage of a private wireless telephone system is that it allows customers to use mobile terminals in an office or other localized area rather than a desk phone with a fixed connection to the telephone system. Thus, customers have freedom to move about within the facility, yet remain accessible by phone. The private wireless telephone system can also interface with the public land mobile network, allowing users of the private wireless telephone system to use the same mobile terminal in both networks. Thus, the user can move seamlessly between the private wireless telephone system and public land mobile network.

Many commercial deployments of private wireless telephone systems use a technique known as simulcasting on the downlink frequencies carrying the control channel. That is, multiple radio heads simultaneously transmit the same data from two or more base stations whose coverage areas may overlap. Simulcasting simplifies cell planning in the private wireless telephone system.

BRIEF SUMMARY OF THE INVENTION

The present invention relates to a simulcasting method that is useful in wireless communication networks, such as a private wireless telephone system. Simulcast signals are transmitted from two radio heads whose coverage area overlaps. The simulcast signals comprise a plurality of frames, each frame comprising a plurality of bits. One or more bits in at least one of the simulcast signals is randomized in order to change the phase relationship of the simulcast signals from one frame to the next. By varying the phase relationship of the simulcast signals from one frame to the next, long nulls where the overlapping signals are 180° out-of-phase are avoided.

DETAILED DESCRIPTION OF THE INVENTION

The present invention is directed to an improvement on a network having proximate antennas engaged in simulcast activity. While especially useful in localized wireless telephone systems, the invention is applicable in other communication networks subject to nulls from simulcasting. While the following discussion is couched in terms of a TIA/EIA-136 communication system, it should be appreciated that the present invention is equally applicable to other differential encoding schemes.

Figure 1:
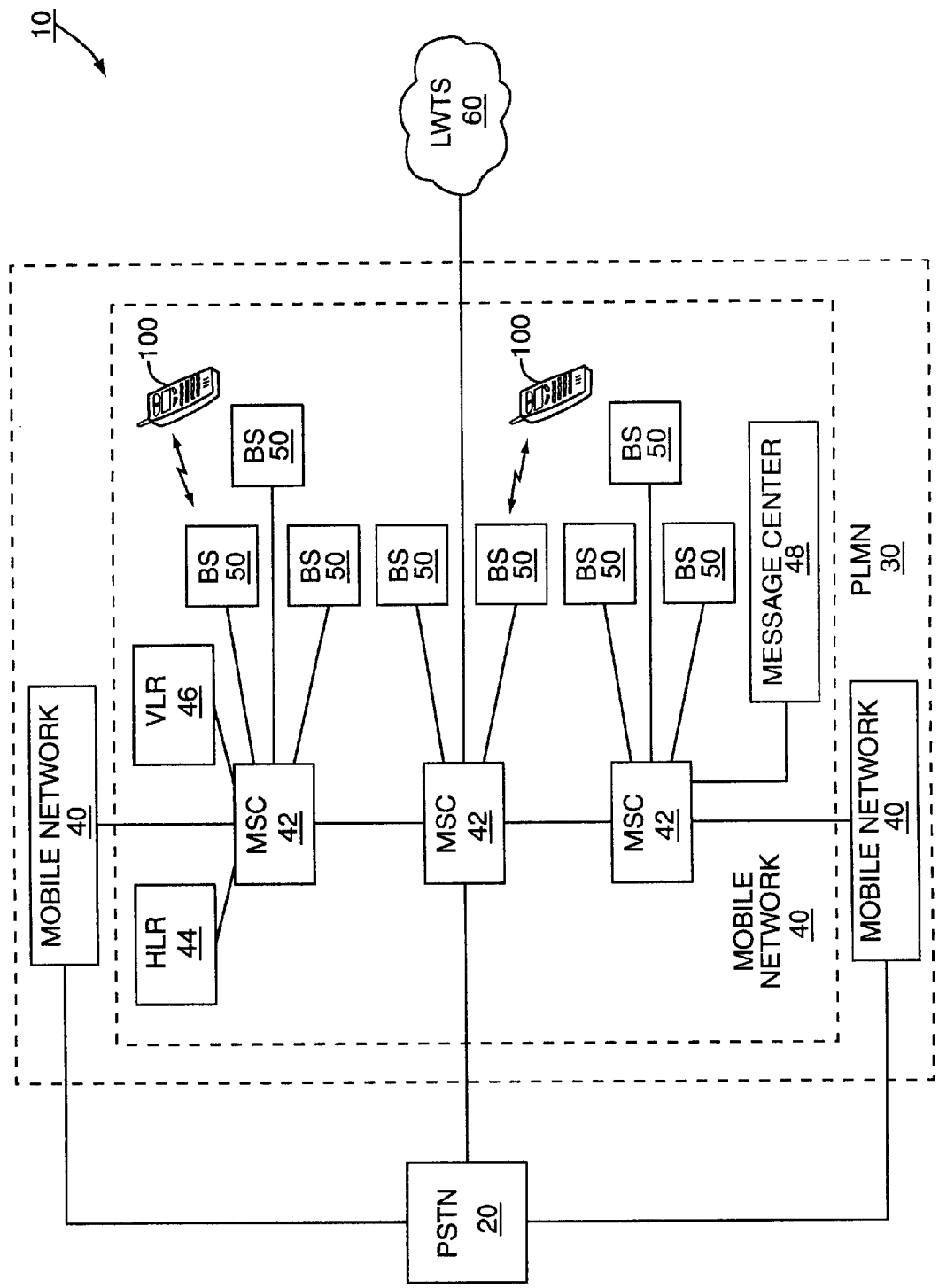
FIG. 1 illustrates a schematic view of a communication system amenable to use with the present invention.

Turning now to FIG. 1, a communication system 10 is illustrated. In particular, the communications system 10 includes the Public Switched Telephone Network (PSTN) 20 and the Public Land Mobile Network (PLMN) 30, which may, in turn, be connected to one or more Localized Wireless Telephone Systems (LWTS, only one shown) 60. LWTS 60 may be proprietary or public. While not shown, satellites may be used as needed either within the PSTN 20 or the PLMN 30 to provide remote communication links, such as across oceans or the like. The operation of the PSTN 20 is well established and subject to extensive documentation beyond the scope of the present invention and therefore a more detailed discussion is omitted.

PLMN 30 may include a plurality of proprietary mobile networks 40. Each mobile network 40 comprises one or more base stations 50 supporting over-the-air communications with mobile terminals 100. Each base station 50 is located in a geographic region, referred to as a cell. In general, there is one base station 50 per cell. Base station 50 includes a plurality of transceivers for communicating with mobile terminals 100 within the cell. Each base station 50 connects to a Mobile Switching Center (MSC) 42. At least one MSC 42 in the PLMN 30, and more likely one MSC 42 in each mobile network 40, is connected via a gateway to the PSTN 20. Some MSCs 42 may also serve as gateways connecting the various mobile networks 40 within the PLMN 30. Gateway functions may be all consolidated at a single MSC 42 within a mobile network 40 or dispersed amongst a plurality of MSCs 42 within a mobile network 40. The function of the MSCs 42 is to route calls and signals in the mobile network 40 to the appropriate destination. To perform this function, a mobile network 40 relies on the HLR 44 and the VLR 46. HLR 44 and VLR 46 store information concerning the whereabouts of mobile terminal users. This information typically includes the user's name and address for billing purposes, the serial number of the user's mobile terminal 100, and the services that the subscriber is entitled to receive. Together, the HLR 44 and the VLR 46 provide the information needed by the MSCs 42 to locate mobile terminals 100. The exact protocols and communication regimens between the various entities in a mobile network 40 are well documented, such as in TIA/EIA-136, which is hereby incorporated by reference in its entirety.

LWTS 60 is typically a private network installed in a building or group of buildings. LWTS 60 may be used, for example, by a large corporation. LWTS 60 allows employees or other persons working in the building to use a mobile terminal 100 as an office telephone. LWTS 60 connects with an MSC 42 in the PLMN 30. Thus, users of the LWTS 60 may move seamlessly between the PLMN 30 and the LWTS 60. LWTS 60 comprises a control and radio interface (not shown) and a plurality of transceiver stations, as will be explained in greater detail with reference to FIG. 3.

Figure 2:
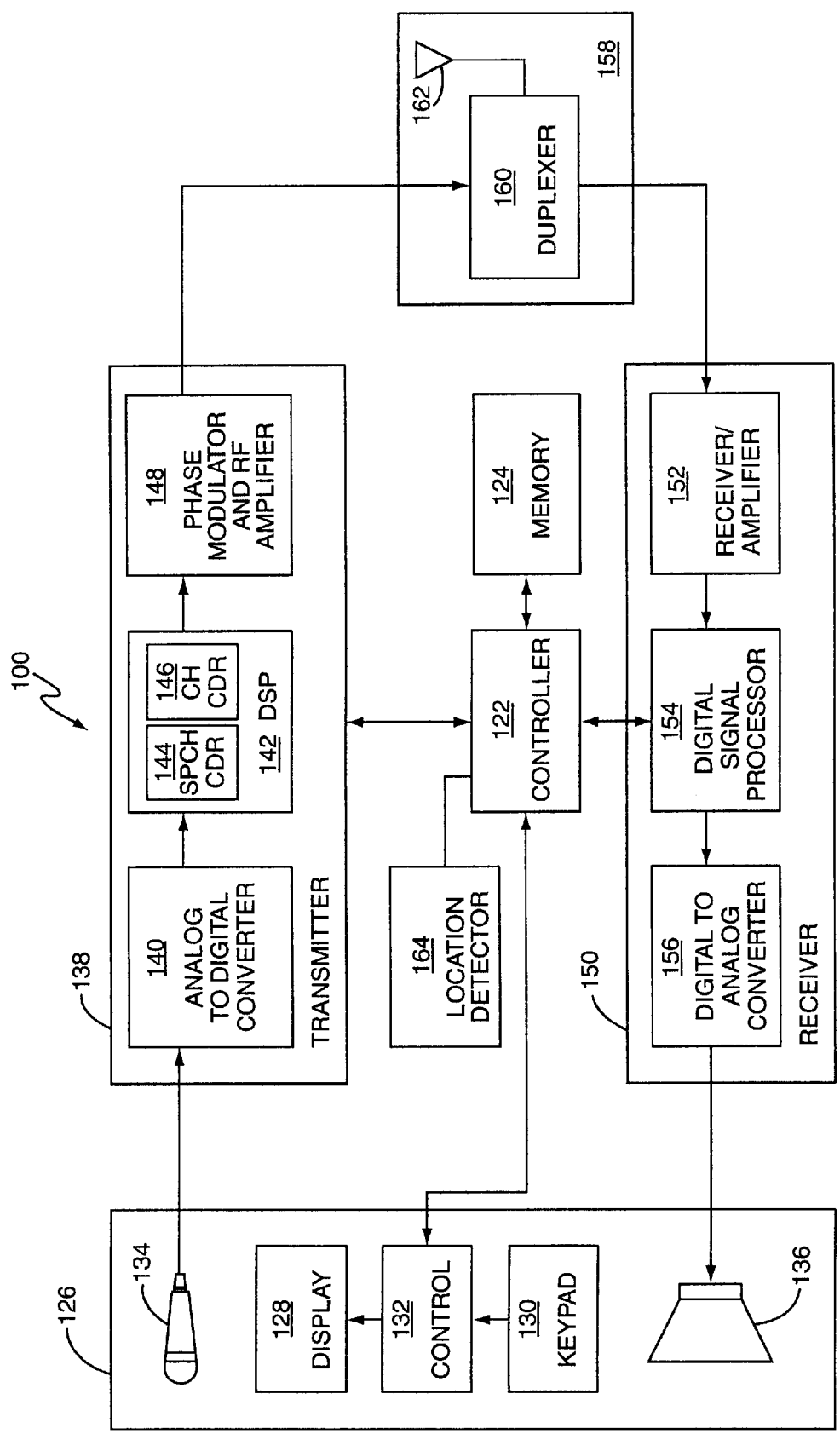
FIG. 2 illustrates a schematic view of a mobile terminal, such as may be used in the communication system of FIG. 1.

FIG. 2 is a functional block diagram of an exemplary mobile terminal 100. The term mobile terminal as used herein comprises a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; a conventional laptop and/or palmtop receiver, or other appliance that includes a radiotelephone transceiver and processing capabilities. Mobile terminals 100 may also be referred to as "pervasive computing" devices or telephones.

Mobile terminal 100 typically includes a controller 122, an operator interface 126, a transmitter 138, a receiver 150, and an antenna assembly 158. Operator interface 126 typically includes a display 128, keypad 130, interface control 132, microphone 134, and a speaker 136. Display 128 allows the operator to see dialed digits, call status, and other service information. Keypad 130 allows the operator to dial numbers, enter commands, and select options. Interface control 132 interfaces the display 128 and keypad 130 with the controller 122. Microphone 134 receives acoustic signals from the user and converts the acoustic signals to an analog electrical signal. Speaker 136 converts analog electrical signals from the receiver 150 to acoustic signals that can be heard by the user.

The analog electrical signal from the microphone 134 is supplied to the transmitter 138. Transmitter 138 includes an analog to digital converter 140, a digital signal processor 142, and a phase modulator and RF amplifier 148. Analog to digital converter 140 changes the analog electrical signal from the microphone 134 into a digital signal. The digital signal is passed to the digital signal processor (DSP) 142, which contains a speech coder 144 and channel coder 146. Speech coder 144 compresses the digital signal and the channel coder 146 inserts error detection, error correction and signaling information. DSP 142 may include, or may work in conjunction with, a DTMF tone generator (not shown). The compressed and encoded signal from the digital signal processor 142 is passed to the phase modulator and RF amplifier 148, which are shown as a combined unit in FIG. 2. The modulator converts the signal to a form that is suitable for transmission on an RF carrier. RF amplifier 148 then boosts the output of the modulator for transmission via the antenna assembly 158.

Receiver 150 includes a receiver/amplifier 152, digital signal processor 154, and a digital to analog converter 156. Signals received by the antenna assembly 158 are passed to the receiver/amplifier 152, which shifts the frequency spectrum, and boosts the low-level RF signal to a level appropriate for input to the digital signal processor 154.

Digital signal processor 154 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data are passed to the controller 122. Speech data is processed by a speech decoder and passed to the digital to analog converter 156. Digital signal processor 154, may include, or may work in conjunction with, a DTMF tone detector (not shown). Digital to analog converter 156 converts the speech data into an analog signal that is applied to the speaker 136 to generate acoustic signals that can be heard by the user.

Antenna assembly 158 is connected to the RF amplifier of the transmitter 138 and to the receiver/amplifier 152 of the receiver 150. Antenna assembly 158 typically includes a duplexer 160 and an antenna 162. Duplexer 160 permits full duplex communications over the antenna 162.

Controller 122 coordinates the operation of the transmitter 138 and the receiver 150, and may for instance take the form of a typical microprocessor. This microprocessor may be a dedicated or shared microprocessor and may be a single processor or multiple parallel processors as needed or desired. This coordination includes power control, channel selection, timing, as well as a host of other functions known in the art. Controller 122 inserts signaling messages into the transmitted signals and extracts signaling messages from the received signals. Controller 122 responds to any base station 50 commands contained in the signaling messages, and implements those commands. When the user enters commands via the keypad 130, the commands are transferred to the controller 122 for action. Memory 124 stores and supplies information at the direction of the controller 122 and typically includes both volatile and non-volatile portions.

Figure 3:
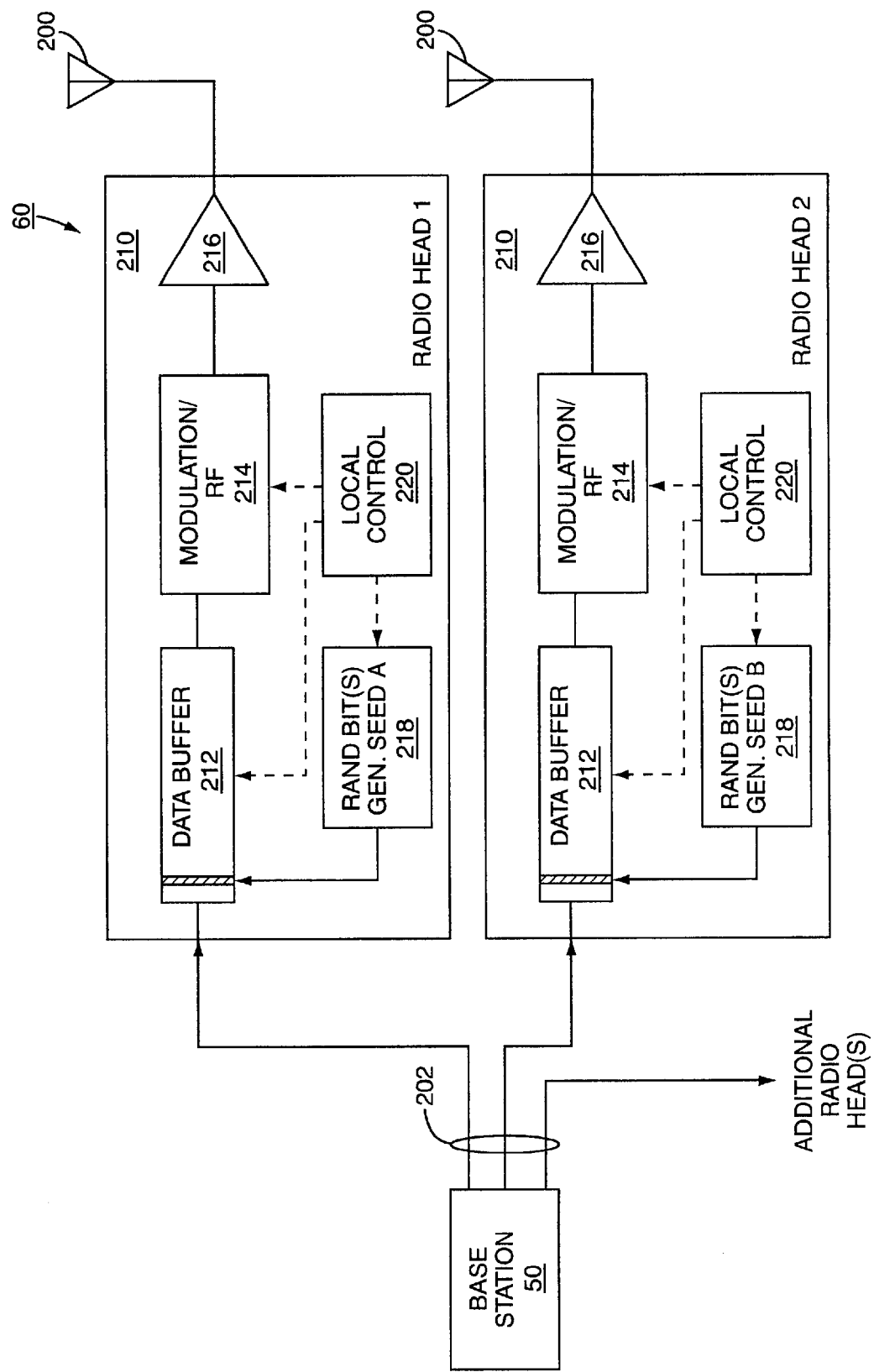
FIG. 3 illustrates a schematic view of a Local Wireless Telephone System adapted for use with the present invention.

FIG. 3 illustrates an exemplary LWTS 60 in greater detail. LWTS 60 comprises one or more base stations 50. A plurality of radio heads 210 are connected by a transmission cable 202 to the base station 50. Transmission line 202 may be a coaxial cable, a waveguide, a strip transmission line, a twisted pair, or the equivalent. Each radio head 210 is coupled to an antenna 200. Radio head 210 comprises a data buffer 212, a modulator 214, a power amplifier 216, a random bit generator 218, and a local controller 220. Data to be transmitted through the antenna 200 is initially stored in data buffer 212. Local controller 220 causes random bit generator 218 to generate random bits as needed for insertion into transmitted signals, as will be hereinafter described. Modulator 214 modulates the data to the desired RF channels. Power amplifier 216 amplifies the modulated signal in a conventional manner. Each random bit generator 218 may include a different seed.

In the exemplary LWTS 60, the technique of simulcasting is used on downlink frequencies carrying the control channel. That is, multiple radio heads 210 transmit simultaneously the same data on the same frequency from different locations. The simulcast signals may overlap.

In most LWTSs 60, the propagation channel is essentially static, without Rayleigh fading typically seen in cellular networks. When a mobile terminal 100 is located in a region where the power from two simulcasting radio heads 210 is roughly equivalent, deep phase nulling of the signal can occur. That is, if the two simulcast signals arrive at the mobile terminal 100 at the same level and are 180° out-of-phase, then the simulcast signals will cancel each other out, making it difficult or impossible to demodulate the signal. The phase nulls also raise the noise floor in the area around the phase null. The increase in the noise floor may cause the bit error rate (BER) to increase and degrade performance of the mobile terminal 100.

In a null, a mobile terminal 100 may repeatedly fail to detect and demodulate the control channel. These repeated failures may cause the mobile terminal 100 to drop off the original control channel and perform a control channel reselect function. Needless channel reselection unnecessarily drains battery power from the mobile terminal 100, shortening its effective operation time. Further, placement in a null may mean that the mobile terminal 100 may not receive an incoming call or be able to secure service for an outgoing call.

In conventional simulcasting techniques, the exact same bits are being modulated in the same manner for all simulcast signals. The coherent signals thus being transmitted at each antenna 200 will maintain the exact same phase relationship from frame to frame. If, however, one or two bits within the simulcast signals are sacrificed and independently randomized at the radio head 210, the phase relationship between the coherent symbols of the individual downlink simulcast signals will likewise change from frame to frame. The differential encoding scheme of TIA/EIA-136 ensures that a phase change at a point $t_o$ will carry forward in time, not just locally around the change.

If the phase relationship of the symbols of the individual downlink simulcast signals changes randomly from frame to frame, then the phase relationship of the individual simulcast signals will also change from frame to frame. Consequently, if a null is formed by two simulcast signals being 180° out of phase in one frame, then most likely, due to the independent random differential symbol created in each simulcast signal by the present invention, the simulcast signals will not be out of phase on the next frame. If two bits are used, a 90° phase shift may be put on each frame, so the probability of going from a null on one frame to a null on the next frame is only 25 percent. This is sufficient to break up the repeated pattern of CRC failures of a sleeping mobile terminal 100 in a phase null.

Figure 4:
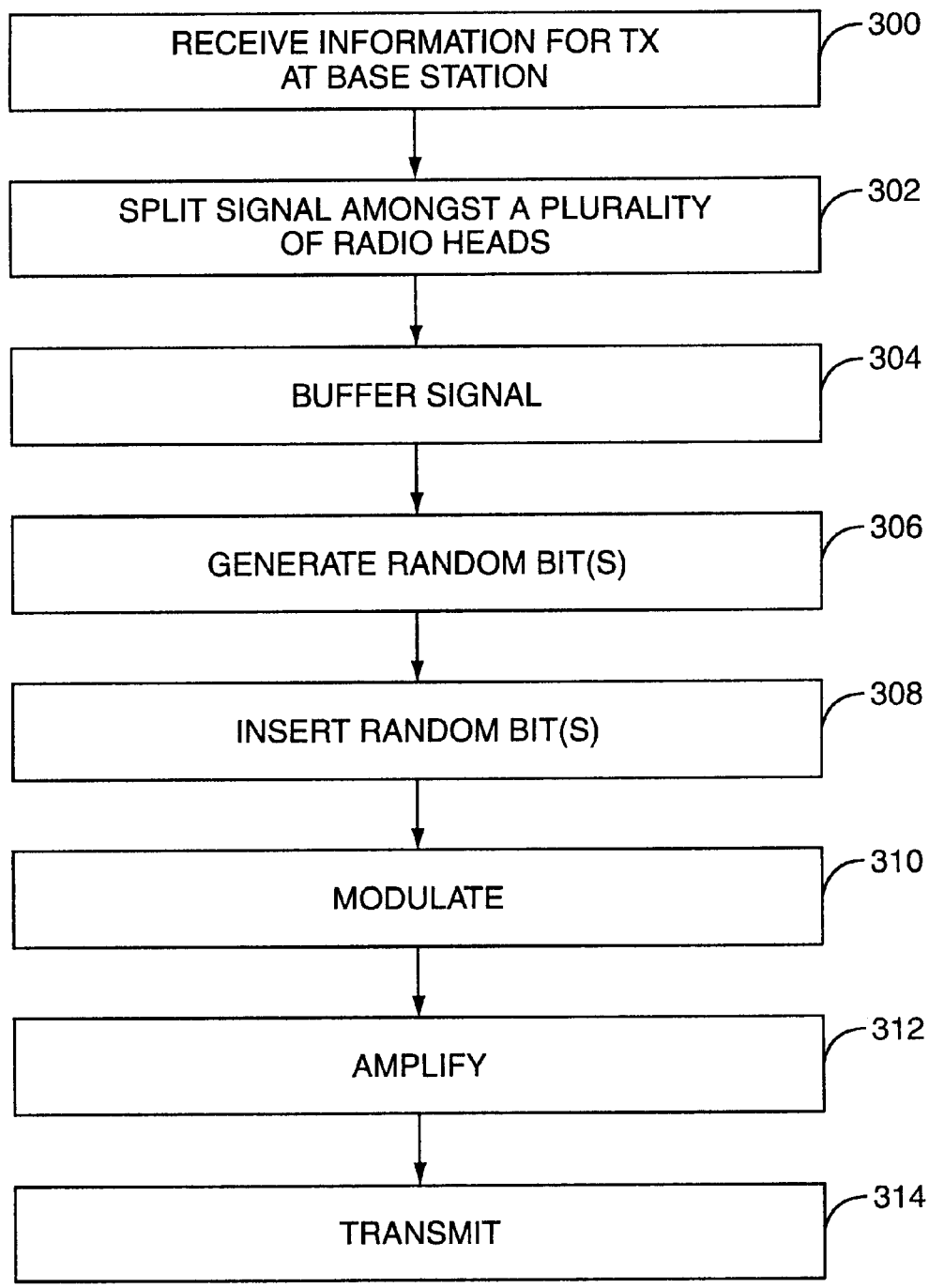
FIG. 4 illustrates a flow chart embodying the present invention.

FIG. 4 illustrates the simulcasting method of the present invention. Initially, information is received at the base station 50 for transmission (block 300). This information is in the form of an incoming signal, perhaps wireless, but more likely wire-based. This signal is split amongst the plurality of radio heads 210 (block 302) over transmission line 202 by conventional splitters (not shown). At each radio head 210, the signal is input frame-by-frame into buffer 212 (block 304). Local controller 220 instructs the random bit generator 218 to generate at least one random bit per frame (block 306). In the exemplary embodiment, two random bits per frame are generated. Those skilled in the art will realize, however, that random bits do not have to be generated in every frame.

Regardless of number, the random bit(s) are "inserted" into the frame (block 308) at predetermined location(s). Note that insertion, as used herein, includes adding a bit to the data in the buffer, as well as randomly changing an existing bit at a predetermined location in the frame. When there is more than one random bit, these random bits may be offset or colocated within the frame. In a first embodiment, the bit(s) are inserted at reserved locations within a frame. Reserved bits presently serve no purpose, but are set to a default value of a logical "one" for lack of a better setting. In a second embodiment, the random bit(s) are inserted in place of information bearing symbols. In the event that the random bit is inserted in place of an information bit, error correction coding may correct any errors so introduced. One induced bit error in a block of coded data may have minimal impact, especially in the generally benign LWTS environment.

An induced bit error would also have implication in terms of BER measurement by the mobile terminal 100, since successfully error corrected, decoded bits are re-encoded and used to estimate BER against raw demodulated bits. In this case, one or two bits, depending on the number of random bits inserted, will have an error rate of 50%. The bias rate in this measurement caused by the introduction of known errors can be adjusted out.

It is noted that for breaking up repeated CRC failure on the DCCH, only one or two sacrificial bits are needed per 1.28 second superframe. To help Frame Error Rate (FER) performance on a Digital Traffic Channel (DTC) only one or two sacrificial bits are needed per 20 ms frame.

After random bit creation, the simulcast signal is modulated by modulator 214 (block 310) and amplified by power amplifier 216 (block 312). After amplification, the simulcast signals are transmitted by respective radio heads 210 to the mobile terminal (block 314). As used herein, the term simulcast signals means two or more signals simultaneously broadcast from different locations, wherein the two signals are identical or nearly identical. In the present invention, the simulcast signals are identical except for the few randomized bits.

In an alternate embodiment, random bit generators 218 may be located in the base station 50 proper or even in the MSC 42 if so desired. These random bits would be sent to the radio heads 210 with addressing information or the like and incorporated into the signal in the buffers 212. The present invention works best when the random bits are independently generated. This may be done by taking consecutive bits off a random string of bits, or by pulling bits from different random bit generators 218. To maximize the likelihood that random bit generators 218 generate different strings of random bits, different seeds A and B may be used.

Figure 5A:
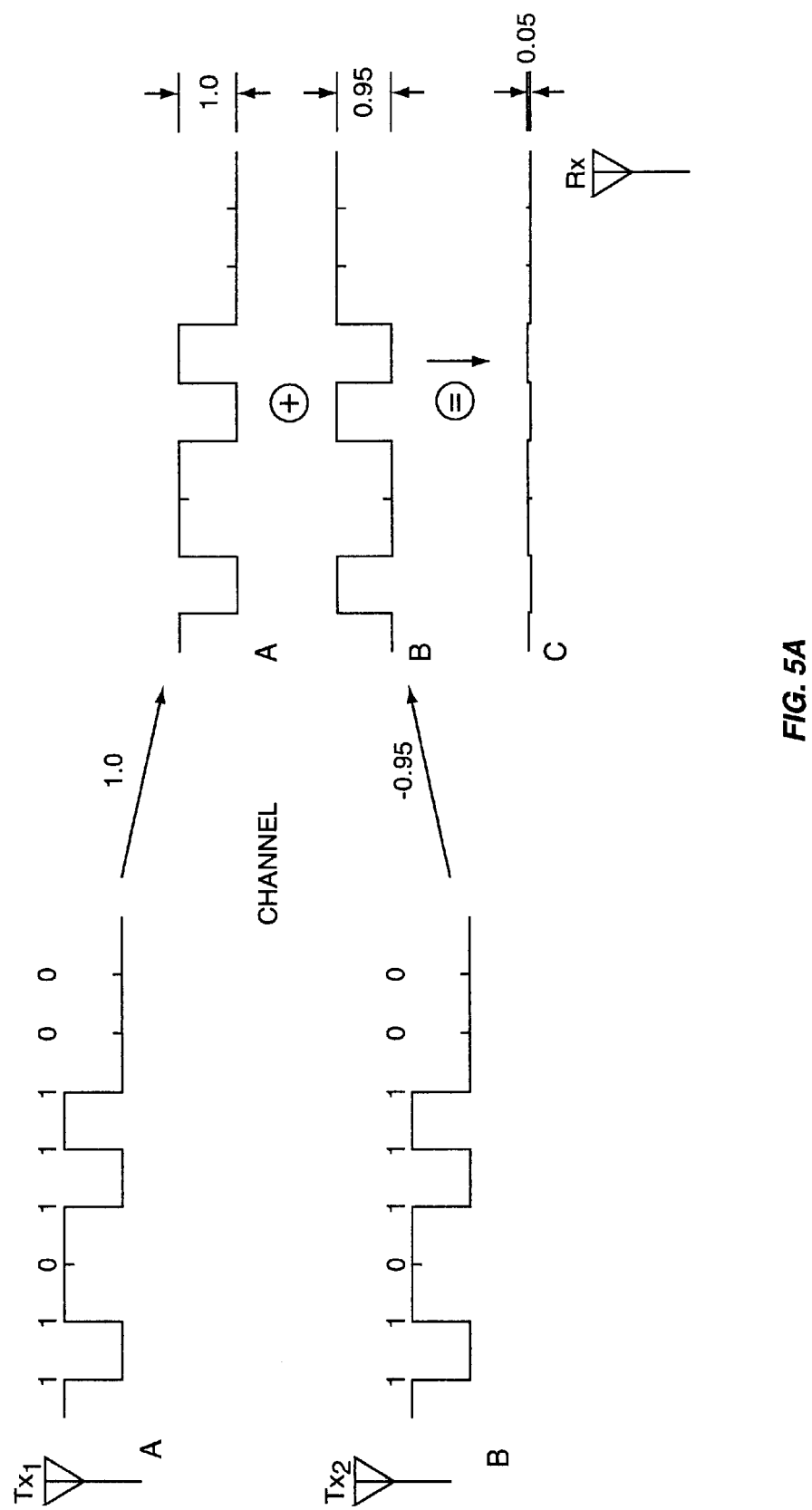
FIG. 5A illustrates two simulcast signals without a randomized bit.
Figure 5B:
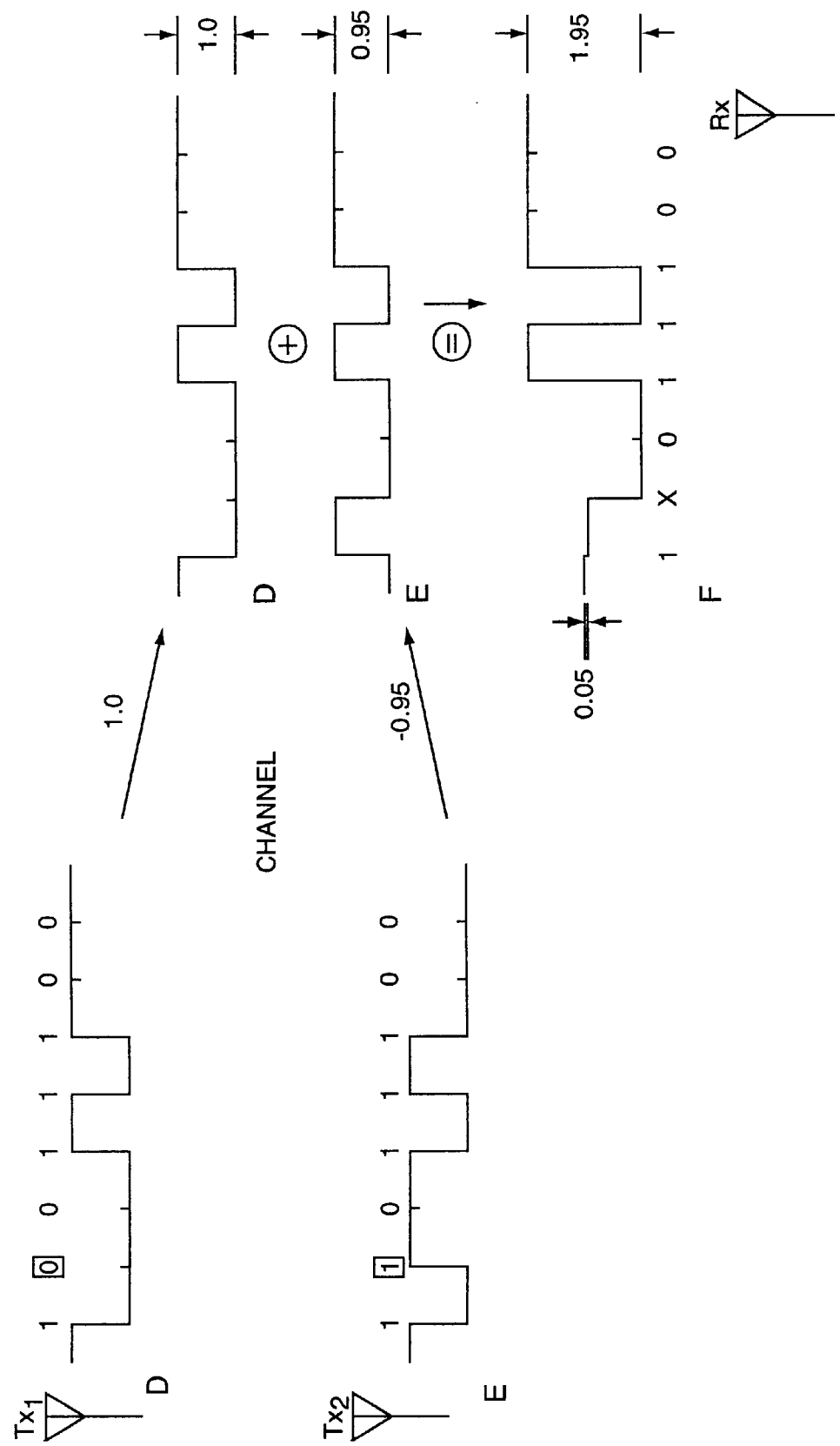
FIG. 5B illustrates two simulcast signals with one randomized bit.

FIGS. 5A and 5B illustrate how the simulcast method of the present invention helps prevent phase nulls. FIG. 5A shows two simulcast signals, denoted A and B. The simulcast signals are differentially modulated. Thus, a transition from "1" to "0" or vice versa represents a binary "1". In FIG. 5A, the simulcast signals A and B are identical. Assuming that these simulcast signals A and B are 180° out-of-phase when received by the mobile terminal, the two signals A and B will cancel, as shown on the right side of FIG. 5A. Thus, the mobile terminal may not be able to demodulate the resulting signal, which is denoted as C.

FIG. 5B shows two simulcast signals, denoted D and E, which have been differentially modulated. One bit in each of the simulcast signals D and E has been randomized, as indicated by being blocked. The randomization has resulted in different bits appearing in the two signals. Again, assuming that the signals are received 180° out-of-phase at the mobile terminal, the simulcast signals D and E do not cancel. The resulting signal, denoted as signal F, is shown.

Figure 6A:
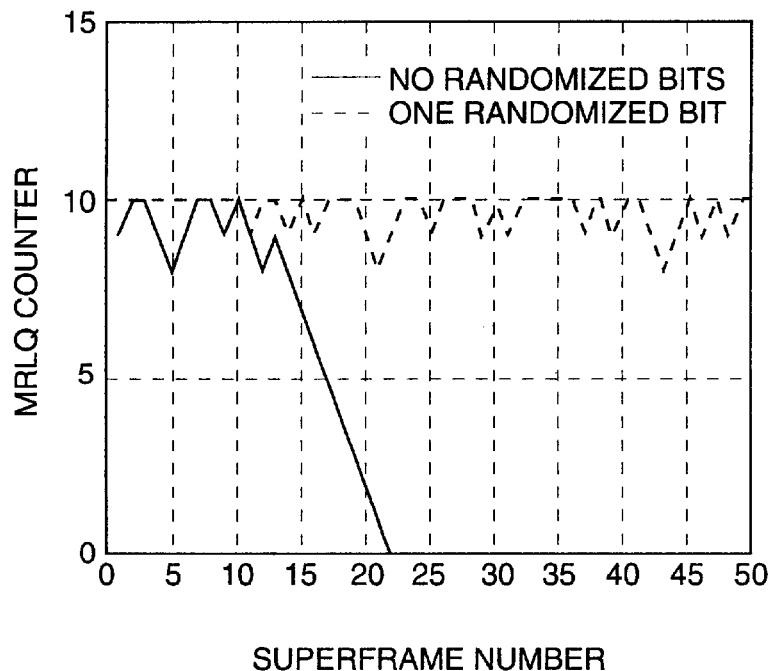
FIGS. 6A and 6B show exemplary test results using the present method.
Figure 6B:
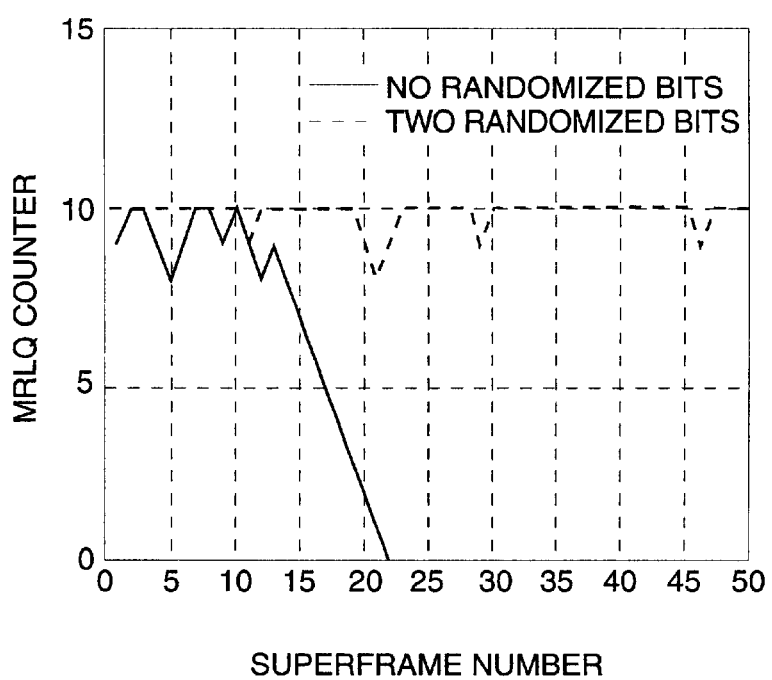

The efficaciousness of the present invention is illustrated in FIGS. 6A and 6B. It is known in the field of mobile communications to maintain a counter, known as the Monitoring Radio Link Quality (MRLQ), which indicates a Radio Link Failure Condition. The MRLQ counter is basically a "leaky bucket" counter, which is incremented when the CRC or other signal strength indicator is good, but decremented when the CRC or other signal strength indicator is bad. The counter includes an upper limit of, and starts at, ten. If the counter reaches zero, then Radio Link Failure has been reached. Upon reaching this condition, the mobile terminal 100 is forced to scan for another channel upon which to camp. In FIGS. 6A and 6B, the mobile terminal 100 is within ~0.04 wavelengths of a null, such that the phase offset between two equal power received signals is 165 degrees out of phase. A static channel is used for each individual simultaneously broadcast signal. The Error Vector Magnitude (EVM) of each transmitter is 10%, raising the effective noise floor for the demodulator significantly. The solid line, in both FIGS. 6A and 6B, indicates the MRLQ counter where no random bits are used. As can be seen, it rapidly deteriorates to zero, forcing channel reselection. In contrast, the dotted line in FIG. 6A represents the MRLQ for the same phone with one random bit used. The counter never dips below eight. The dotted line in FIG. 6B represents the MRLQ counter with the use of two random bits. The counter is decremented even fewer times than in FIG. 6A and has much better performance than the prior art.

This technique will certainly place other mobile terminals 100 in temporary nulls that otherwise would not exist in a clear simulcast reception field. This is a calculated trade-off. Consider the following example. Four mobile terminals 100 are positioned in the same region, where the individual signals are of relatively the same power, and one is in a null. If the present methodology is not performed, the mobile terminal 100 in the null remains in the null, and will drop off the control channel. However, with the present methodology, the null will potentially hop from mobile terminal 100 to mobile terminal 100, causing occasional CRC failures, yet none of the mobile terminals 100 will drop off the control channel. The occasional CRC failure is acceptable since control channel data may be repeated from superframe to superframe.

The present methodology also provides the benefit that since these bits are randomized independently at each antenna 200, there is no need for cell planning or "phase offset reuse" within the LWTS 60. This may promote the efficient use of LWTS 60 in environments heretofore thought unsuitable for such a system.

In an alternate embodiment, only some of the radio heads 210 or base stations 50 utilize the randomization scheme of the present invention. However, to maximize the efficaciousness of the present invention, at any potential null, at least one of the signals contributing to the null should be randomized according to the present invention.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of reducing phase nulls in a wireless communications environment, comprising:
   transmitting a first simulcast signal from a first radio head;
   transmitting a second simulcast signal from a second radio head simultaneously with said first simulcast signal;
   randomizing at least one selected bit in at least one of said first and second simulcast signals to vary the phase relationship of said first and second simulcast signals over a plurality of frames.

2. The method of claim 1 wherein randomizing at least one selected bit in at least one of said first and second simulcast signals comprises generating a random bit with which said at least one selected bit is randomized.

3. The method of claim 1 wherein randomizing at least one selected bit in at least one of said first and second simulcast signals comprises randomizing two selected bits in at least one of said first and second simulcast signals.

4. The method of claim 1 wherein randomizing at least one selected bit in at least one of said first and second simulcast signals comprises randomizing a selected bit at a predetermined location within a frame.

5. The method of claim 1 wherein randomizing at least one selected bit in at least one of said first and second simulcast signals comprises randomizing an information bearing bit within a frame.

6. The method of claim 1 wherein randomizing at least one selected bit in at least one of said first and second simulcast signals comprises randomizing at least one selected bit in at least one of said first and second simulcast signals per frame.

7. The method of claim 1 wherein randomizing at least one selected bit in at least one of said first and second simulcast signals comprises randomizing at least one selected bit in at least one of said first and second simulcast signals per superframe.

8. A localized wireless telephone system comprising:
   a plurality of radio heads broadcasting simulcast signals;
   at least one controller to randomize at least one selected bit in at least one of said simulcast signals for at least one of said radio heads to vary the phase relationship of said simulcast signals over a plurality of frames.

9. The localized wireless telephone system of claim 8 wherein said simulcast signal is broadcast on a control channel.

10. The localized wireless telephone system of claim 8 comprising a plurality of controllers located in respective radio heads.

11. The localized wireless telephone system of claim 10 wherein each radio head further comprises a buffer for strong said simulcast signal prior to transmission.

12. The localized wireless telephone system of claim 11 wherein each radio head further comprises a random bit generator to generate a random bit, and wherein said controller in each said radio head operative to insert said random bit generated by said random bit generator into said simulcast signal stored in said buffer.

13. The localized wireless telephone system of claim 8 wherein said controller randomizes said at least one selected bit once per frame at a reserved bit position within said frame.

14. The localized wireless telephone system of claim 8 wherein said controller randomizes said at least one selected bit once per frame at an information bearing bit position within said frame.

15. A method of reducing phase nulls in a wireless communications environment, comprising:
   simultaneously broadcasting simulcast signals from a plurality of radio heads; and
   independently randomizing at least one selected bit within said simulcast signals at each of said radio heads to vary the phase relationship of said simulcast signals over a plurality of frames.

16. The method of claim 15 wherein independently randomizing at least one selected bit within said simulcast signals at each of said radio heads comprises independently randomizing at least one selected bit per frame.

17. The method of claim 15 independently randomizing at least one selected bit within said simulcast signals at each of said radio heads comprises independently randomizing at least one selected bit per superframe.

* * * * *